(12) United States Patent
Quinn et al.

(10) Patent No.: US 7,860,763 B1
(45) Date of Patent: Dec. 28, 2010

(54) PROACTIVE TAX PREPARATION

(75) Inventors: Chris Quinn, Del Mar, CA (US); Matt E. Hart, Lunenburg, MA (US)

(73) Assignee: Intuit Inc., Mountain View, CA (US)

( * ) Notice: Subject to any disclaimer, the term of this patent is extended or adjusted under 35 U.S.C. 154(b) by 1045 days.

(21) Appl. No.: 11/036,269

(22) Filed: Jan. 13, 2005

Related U.S. Application Data

(63) Continuation-in-part of application No. 10/982,661, filed on Nov. 4, 2004, now Pat. No. 7,636,742.

(60) Provisional application No. 60/608,035, filed on Sep. 7, 2004.

(51) Int. Cl.
*G06F 17/22* (2006.01)
*G07F 19/00* (2006.01)
*G07B 17/00* (2006.01)
*G06F 15/02* (2006.01)
*G07C 1/10* (2006.01)

(52) U.S. Cl. .............................. 705/31; 705/30; 705/32

(58) Field of Classification Search ............... 705/30–32
See application file for complete search history.

(56) References Cited

U.S. PATENT DOCUMENTS

| | | | |
|---|---|---|---|
| 4,890,228 A | 12/1989 | Longfield | |
| 5,138,549 A | 8/1992 | Bern | |
| 5,193,057 A | 3/1993 | Longfield | |
| 5,644,724 A | 7/1997 | Cretzler | |
| 5,724,523 A | 3/1998 | Longfield | |
| 5,774,872 A | 6/1998 | Golden et al. | |
| 5,875,433 A | 2/1999 | Francisco et al. | |
| 5,909,794 A | 6/1999 | Molbak et al. | |
| 5,963,921 A | 10/1999 | Longfield | |
| 6,032,137 A | 2/2000 | Ballard | |
| 6,202,052 B1 * | 3/2001 | Miller | 705/31 |
| 6,473,741 B1 | 10/2002 | Baker | |
| 6,493,637 B1 * | 12/2002 | Steeg | 702/19 |
| 6,697,787 B1 | 2/2004 | Miller | |
| 6,823,478 B1 | 11/2004 | Prologo et al. | |
| 7,257,553 B1 * | 8/2007 | Baker | 705/31 |
| 2001/0037268 A1 * | 11/2001 | Miller | 705/31 |
| 2002/0013747 A1 * | 1/2002 | Valentine et al. | 705/31 |

(Continued)

OTHER PUBLICATIONS

*Backup Powers Online Data Protection Service for Quicken TurboTax Users*, Business Wire, Jan. 17, 2000, p. 1211.

(Continued)

*Primary Examiner*—Matthew S Gart
*Assistant Examiner*—Ig T An
(74) *Attorney, Agent, or Firm*—Osha • Liang LLP

(57) ABSTRACT

An automated system prepares a new tax return for a user based on information associated with the user's return from a previous year. The system uses the tax return from the previous year to obtain taxpayer data and to identify sources of current data. It retrieves current year information from the sources and uses it together with data from the previous year return to prepare a new tax return with minimal user assistance. In an embodiment, the system determines the likely accuracy of a new tax return generated based on the previous year tax return, and prepares the new tax return only if the likely accuracy is above a predetermined threshold.

15 Claims, 3 Drawing Sheets

U.S. PATENT DOCUMENTS

| | | | |
|---|---|---|---|
| 2002/0023055 A1 | 2/2002 | Antognini et al. | |
| 2002/0111835 A1* | 8/2002 | Hele et al. | 705/4 |
| 2002/0111888 A1* | 8/2002 | Stanley et al. | 705/31 |
| 2002/0152165 A1* | 10/2002 | Dutta et al. | 705/43 |
| 2003/0036912 A1* | 2/2003 | Sobotta et al. | 705/1 |
| 2003/0074142 A1* | 4/2003 | Steeg | 702/19 |
| 2003/0115198 A1 | 6/2003 | Singer et al. | |
| 2003/0233296 A1* | 12/2003 | Wagner | 705/31 |
| 2004/0177022 A1* | 9/2004 | Williams et al. | 705/36 |
| 2004/0225581 A1 | 11/2004 | Wyle et al. | |
| 2004/0267595 A1 | 12/2004 | Woodings et al. | |
| 2006/0080284 A1 | 4/2006 | Masonis et al. | |
| 2006/0155618 A1* | 7/2006 | Wyle | 705/31 |

OTHER PUBLICATIONS

International Search Report from PCT/US01/26182, dated Jan. 2, 2002.

*Internet Access: Intuit to Provide Internet Access Directly From Quicken—Pt 3*, Oct. 23, 1995, Work—Group Computing Report, vol. 6, No. 283.

Kelley, D.; *MacinTax Final Version Releases Earlier Than Ever*, Business Wire, Jan. 14, 1993.

*Open Financial Exchange*, Specification 2.0, Intuit Inc., Microsoft Corp. 537 pages, (Apr. 2000).

Quicken Turbo Tax: User's Guide- Tax Year 1999.

Turbo Tax: The Easiest Way to Do Your Taxes User's Guide for Windows 95 & Windows 3.1. Tax Year 1995.

"H&R Bock and NetZeroATM Offer Consumers Fast, Accurate Online Tax Preparation and Filing," United Online Press Release, Mar. 28, 2000, [online] [Retrieved on May 29, 2006] Retrieved from the Internet<URL:http://wwww.irconnect.com/untd/pages/news_releases.html?d=16829>.

"Microsoft and Block Financial Help Consumers Ease the Pain of Tax Season," Microsoft PressPass, Jan. 7, 1998, [online] [Retrieved on May 29, 2006] Retrieved from the Internet<URL:http://www.microsoft.com/presspass/press/1998/jan98/kiplngpr.mspx).

Internet Access: Intuit Provide Internet Access Directly From Quicken-Pt 1., Work-Group Computing Report, Oct. 23, 1995, vol. 6, No. 283, 3 pages.

Internet Access: Intuit to Provide Internet Access Directly From Quicken-Pt. 2, Work-Group Computing Report, Oct. 23, 1995, vol. 6, No. 283, 1 page.

* cited by examiner

| View information by: | Wages and Salaries | Stock sales | Dividends | Interest | Deductions | Credits | Banks and brokers | CA state |
|---|---|---|---|---|---|---|---|---|

Income ⌐515a $64,000

Wages and Salaries (edit all) $60,000
  Intuit $40,000
  Solana Beach School District $15,000
  Amton Interiors $5,000
  Add a new wage (w-2)... ⌐515b

Banks and Brokers (edit all) $4,000
  Bank of America (edit) ⌐515c
    Interest 1099 $1,200
    Dividends 1099 $1,000
           $200
  Salomon Smith Barney (edit)
    Interest (1099) $2,800
    Dividends 1099 $800
    Stock Sales (1099) $1,000
    Employee Stock Sales (1099) $400
           $600

Add a new bank or broker  530

Deductions and Credits $64,000

Deductions (edit all) $60,000

Automatic deductions (edit all)
  Child deduction $1,000
  Standard deduction $1,000
  Learn about other deductions... Not used Mortgage Interest (edit) $15,000
  Contry Wide Home Loan Interest
  income (1098) $15,000

Charitable Contributions (edit all) $2,000
  Goodwill donation $500
  St. James church $700
  more... $800
  Add new charitable contributions...

Other deductions (edit all)
  Moving Expenses $0
  Student loan interest N/A
  Enter a new deduction N/A Tax Credits (edit all) $400
  Automatic tax credits (edit all) $400
  Teacher credit  540 $400

Tax Refund Monitor

Taxable Income $58,000
Total Deductions $18,000
Total tax credits $400

Total taxes paid $15,000
Tax Due $13,800
Refund = $1,200  550

Personal Information  560

Taxpayer and spouse
  Chris Quinn 577-66-8888
  Jane Quinn 577-88-9999
  Filing status - married filing jointly
(edit)

Dependents
  Tom 577-55-8888
  Bob 577-44-8888
  Add a new dependent...

Address and phone (edit)
2137 Via Mar Valle
Del Mar, CA 92014
Home phone: 858-755-9994
Work phone: 858-784-4220

Review this return and prepare it for filing  570

Figure 2

PROACTIVE TAX PREPARATION

CROSS REFERENCE TO RELATED APPLICATIONS

This application is a continuation-in-part of U.S. patent application Ser. No. 10/982,661 entitled "Automated Data Retrieval," filed Nov. 4, 2004 now U.S. Pat. No. 7,636,742, and claims the benefit of U.S. Provisional Patent Application 60/608,035 entitled "My Tax History," filed Sep. 7, 2004, each Application of which is hereby incorporated by reference herein. Subject matter contained in this application is also related to subject matter contained in U.S. patent application Ser. No. 09/935,205, entitled "Automated Tax Return with Universal Data Import," which is incorporated by reference herein.

BACKGROUND

1. Field of the Invention

The present invention relates generally to automated tax return preparation and more specifically to proactively generating a new tax return based on a return from a previous year.

2. Background of the Invention

Completing a tax return for a taxpayer requires a considerable amount of information generated by a variety of sources. Personal and demographic information, as well as payroll, bank, and other types of data are surrendered to a tax preparer, manually entered into a tax preparation software, or painstakingly entered by the taxpayer into forms provided by various taxing authorities.

Although each year's tax return contains information specific to the year for which the return is being filed, a substantial amount of demographic and identity information often remains unchanged from year to year. In addition, the sources consulted to gain other types of information are likely to remain the same for many taxpayers. For example, as long as a taxpayer stays with an employer, the same employer payroll processor typically will provide income and withholding data for the taxpayer. The same is true of banks or other financial institutions that have continuing relationships with the taxpayer. In fact, in the absence of a significant event in the taxpayer's life—such as a move, job change, or change in marital or dependent status—a majority of tax returns may be substantially completed by using only information and information sources from the previous year's tax return.

What is needed is a system that can automatically prepare a taxpayer's tax return for a current year based on the taxpayer's return from a previous year.

SUMMARY OF THE INVENTION

A tax return is prepared for a taxpayer based on information contained in a previous year's return. In one embodiment, information about the taxpayer is extracted from the existing tax return including tax data provider identification information. Tax data, such as wages, income, withholdings, interest, and the like for the new return is automatically requested from one or more tax data providers using the identification information extracted from the old tax return. The requested data is obtained from a data provider, and a new return is generated based on information extracted from the existing tax return and data obtained from the data provider.

Before a new tax return is generated, the taxpayer's profile is determined based on information extracted from an existing tax return. The profile is evaluated using a statistical model for predicting the accuracy of a new tax return generated based on an existing return for a given profile. If a new return is predicted to have an accuracy above a certain threshold according to the model, the new return is generated.

In another embodiment, there is a proactive tax preparation system. The system includes a returns processing module for receiving a plurality of tax returns affiliated with a plurality of taxpayers and extracting data from the tax returns of each of the plurality of taxpayers. There is also a data engine configured to receive data extracted from the plurality of tax returns from the returns processing module, and responsive to the data, to formulate requests for current year tax data about the plurality of taxpayers to a plurality of data providers. The data engine can also receive requested current year tax data from the plurality of data providers. Finally, there is a tax preparation module for receiving data extracted from the tax returns of each of the plurality of taxpayers from the returns processing module and current year tax data from the plurality of data providers from the data engine, and for using the data to generate new tax returns for each of the plurality of taxpayer. The system can be used by a taxpayer, professional tax preparer, or tax preparation service to prepare one or more tax returns.

BRIEF DESCRIPTION OF THE DRAWINGS

FIG. 2 represents a graphical user interface for soliciting a taxpayer input.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

The process of tax preparation can be significantly automated by taking advantage of the fact that certain types of information and certain information sources tend not to change from year to year. A new return can be created based on importing data from a taxpayer's previous year return for fields that are unlikely to change and querying one or more data providers for data associated with information sources that can be identified from the prior year return or meta data about the return. For instance, in a high percentage of cases the name, address, and social security number of the taxpayer do not change from year to year. Likewise, assuming a taxpayer maintains an account with a bank, the same bank can be proactively queried to receive earned income information for the current year. An initial return can be generated based on data retrieved in this way with little if any user intervention. Returns can proactively be created during off-peak times of the year, rather than only during the tax season crunch times, and thus allow processing to be distributed across fewer machines.

Figure 1:
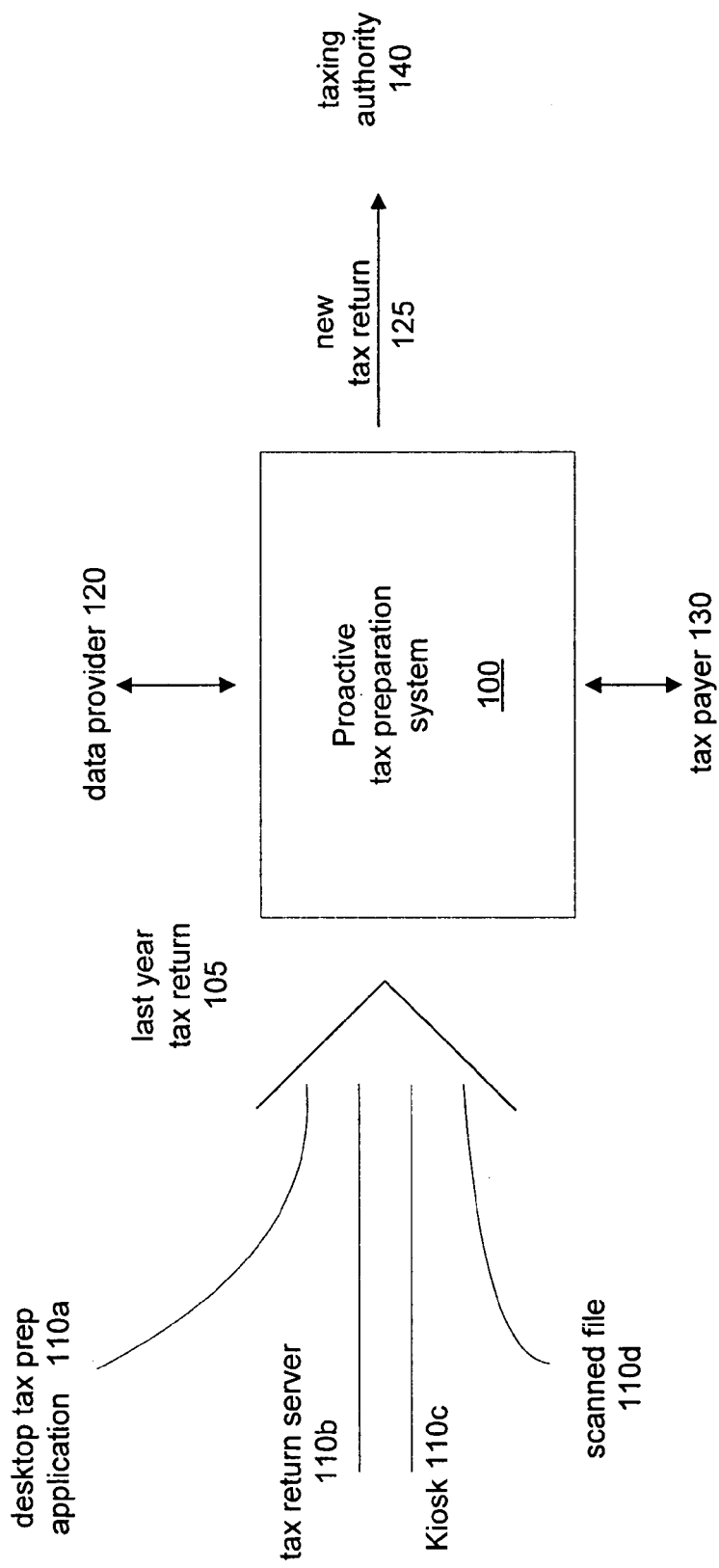
FIG. 1 is a block diagram of a system for generating a new tax return in accordance with an embodiment of the invention.

FIG. 1 is a high-level block diagram of a system for generating a new tax return in accordance with an embodiment of the invention. A taxpayer's previous year tax return 105 is provided to a proactive tax preparation system 100. The tax preparation system 100 extracts information about the taxpayer and data provider information from the previous year tax return 105. The system 100 populates a new tax return 125 with information that is likely to have remained unchanged from the previous year tax return 105. It also requests and receives current year data from one or more data providers 120 based on tax data provider identification information obtained from the previous year tax return 105. The proactive tax system 100 appends the new tax return 125 with the current year data and uses it to complete an initial draft of the new tax return 125. The draft can be provided to the taxpayer 130 for any corrections or additions. If necessary, changes are made to the return 125, which is then e-filed or otherwise transmitted to the taxing authority 140.

The previous year tax return 105 includes one or more IRS forms and information such as the taxpayer's W-2, 1099, or 1098 forms or other documentation submitted to the taxing authority in the previous year. The tax return 105 may be provided from any of a variety of sources 110. These sources may include a desktop tax preparation application 110a or a tax return server 110b communicatively coupled to the proactive tax preparation system 100 through any type of network enabled connection. The desktop tax preparation application may comprise any of a variety of tax preparation software packages. The tax return server 110b may comprise a server where previous year tax returns are stored. For example, if the previous year tax return 105 was prepared with a software application served online or otherwise over a network and submitted directly to a taxing authority by the application, the return 105 may be stored on a tax server 110b. A taxpayer may simply send or upload her return 105, or, in the case of the tax return server 110b, the proactive tax preparation system 100 may query and receive from the server 110b the tax return 105 without any taxpayer intervention. A tax professional preparing multiple tax returns may also upload a group of returns received from her clients. In addition to being asked to provide the tax return 105, a taxpayer or tax professional may be prompted to supply passwords, tax ID information, or other authorizations to be used by the proactive tax preparation system 100 to access data from one or more data providers 120.

A paper copy of a previous year tax return 105 may alternatively be submitted by a taxpayer or tax preparer, for instance through a kiosk 110c at a public location such as a library, a retail store, or a post office. The paper copy is scanned in and optical character recognition (OCR) software is applied to the document to convert the information in particular fields into alphanumeric data before it is processed by the proactive tax preparation system 100. A portion or all of this processing may be performed by a returns processing module 310 of the proactive tax preparation system 100 or may be done at the customer submission site, with the resulting electronic file transmitted to the proactive tax preparation system 100 over a network connection.

The proactive tax preparation system 100 receives the previous year tax return 105 and uses it to extract information about the taxpayer. In an embodiment, for example, the system 100 extracts demographic and other information about the taxpayer from the previous year tax return 105, and uses it to determine whether or not the taxpayer is a good candidate for proactive generation of a new tax return by the system. The extracted information provides a profile of the taxpayer. This profile is analyzed using a model predictive of whether or not, given a taxpayer's profile, there is a high likelihood that that a new tax return based solely on information copied from the old tax return and supplemented with new income information accurately represents the taxpayer.

Assuming the taxpayer is a good candidate, the tax preparation system 100 proactively generates a new tax return 125 for the taxpayer. As described in more detail below, the system 100 imports a subset of information directly from the previous year tax return 105 to the new return 125. The system 100 also extracts information that identifies sources of information that are assumed to have remained the same from the prior year. It uses this source information to query one or more data providers 120 for data from the current year and integrates the information into the new tax return 125. The new tax return is calculated based on the information provided from the previous year return 105 and the data providers 120.

At this or any point before, the system 100 may generate and transmit a message asking the taxpayer if there have been any changes from the previous year to any of a variety of tax categories. If there have been any changes, an interview or questionnaire is then provided to the taxpayer to solicit the new information, which is then used to complete the tax return. The new tax return 125 is provided to the taxpayer, and once taxpayer approval has been provided, the return 125 is provided to the appropriate taxing authority, using an e-file or other electronic submission option if available, or simply by printing out and sending the return 125.

In the system shown in FIG. 1, the proactive tax preparation system 100 and tax return server 110b comprise separate and distinct elements. However, it is not necessary for these and other elements to be housed as shown; the elements can be hosted by other entities or in sub-modules of the elements may stand-alone or together. In addition, embodiments of the invention not require minimal if any intervention from a taxpayer 130, and may be administered primarily between the proactive tax preparation system 100, a tax return source 110, one or more data providers 120, and the taxing authority 140. Likewise, as these and other elements are described throughout the invention, it should be understood that various embodiments of the invention may exclude elements and sub-elements described, or include other components entirely.

Figure 3:
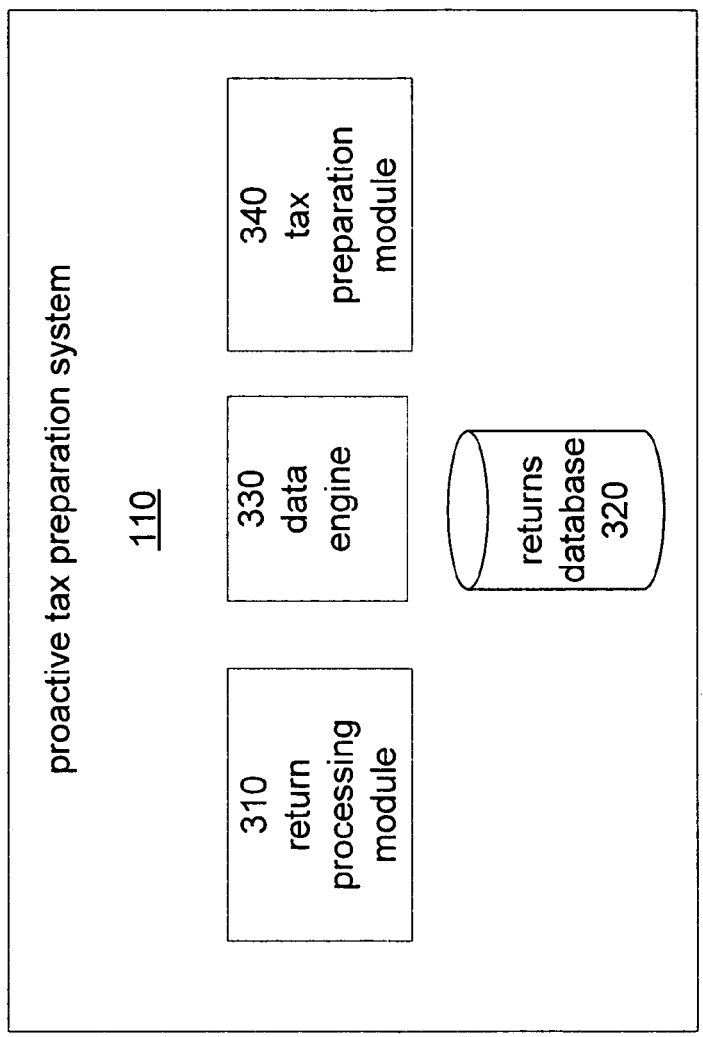
FIG. 3 is a block diagram of a proactive tax preparation system.

FIG. 3 is a high-level block diagram of a proactive tax preparation system 100 in accordance with an embodiment of the invention. The system 100 includes a returns processing module 310, a returns database 320, a data engine 330, and a tax preparation module 340. Through one or more of these modules, the system 100 receives one or more tax returns from a previous tax year 105, requests and receives input from one or more data providers 120 and taxpayers, uses the tax return 105 and the inputs to generate a new tax return 125 and submits the new tax return 125 to a taxing authority 140.

The returns processing module 310 receives the previous year tax return 105, and extracts information from the existing return 105 for the new return 125. The module 310 may include a parser that can extract identifying information for the taxpayer such as the taxpayer's name, address, social security number as well as tax data provider information regarding where the taxpayer's employers, the associated payroll processors, and the various financial institutions at which the taxpayer may hold income producing assets, such as banks, savings and loans, brokerages, pension administrators, credit unions and the like.

The returns processing module 310 uses demographic and other information about the taxpayer such as age, marital status, and/or the channel. This information is used to profile the taxpayer, and the profile is used to confirm that the taxpayer is an appropriate candidate for proactive tax return generation. This determination may be made according to a statistical model that can assess the likelihood of various types of changes in the tax data for a taxpayer, given the taxpayer's profile. The model is based on a multiple-regression analysis of tax returns from a large sample of taxpayers over a multiple year period. The model may be combined with or supplemented by one or more of the models described in U.S. Provisional Patent Application entitled "My Tax History", referenced above, for predicting tax field outcomes or responses given certain taxpayer conditions or inferring a profile of a taxpayer based on known or input information about the taxpayer. Table 1 provides an illustration of possible outcomes regarding the likelihood of change in specific tax return fields that could be generated by such a model.

TABLE 2

Likelihood of Change in Tax Field per Profile

| Profile | 40-45 Year Old Married With Children Taxpayer | 18-21 Dependent EZ Filer | 25-30 Urban Professional |
|---|---|---|---|
| Name | Low | Low | Low |
| SSN | Low | Low | Low |
| Marital Status | Low | Low | Medium |
| Address | Low | Medium | Medium |
| Employers | Low | High | Medium |
| Bank Accounts | Low | Medium | Medium |
| Financial Institutions | Low | Medium | Medium |
| Donations | High | Low | Low |
| Dependents | Medium | Low | Medium |
| Home Ownership Deductions | Low | Low | Medium |

As shown in the table, a taxpayer in the category of married with children between the ages of 40-45 might prove to be the most "stable" in terms of tax inputs compared to other categories of taxpayers and therefore be the relatively best candidate for preparation of a proactive tax return. On the other hand, a 25-30 year old urban professional may be a relatively worse candidate for proactive tax preparation because so many inputs have a medium or high likelihood of change from one year to the next. For such a taxpayer, the proactive tax preparation system 100 may solicit information about life events such as a change in marital status or employer from the prior year tax return 105 from the taxpayer before the new return 125 is generated.

The tax preparation process is tailored to a taxpayer depending on confidence or accuracy levels. If for instance, accurate source information cannot easily be obtained, then no return is generated until the taxpayer undergoes a more conventional or a streamlined interview such as is described in the application, "My Tax History", cross-referenced above. If, by contrast, there is a high likelihood that a tax return generated solely based on the previous year information and supplemented with new income data provided by a data provider 120 will be mostly if not entirely accurate, a return 125 is generated without even consulting the taxpayer.

Assuming proactive tax preparation is appropriate for the taxpayer, the tax preparation module 340 creates a new return 125. Information is provided to the tax preparation module 340 from the returns processing module 310, which is determined, in an embodiment, according to a logical algorithm. For instance, the algorithm might dictate that name, SSN, and other such identifying fields be copied verbatim. In addition, the algorithm might infer that depreciation associated with an asset not fully depreciated the previous year to be depreciated at the same rate in the absence of information that the asset has been disposed of.

The tax preparation module 340 performs the tax calculations and accesses tax tables and forms as needed to complete a taxpayer return. For other fields, such as income and bank account interest, which are assumed to have changed in absolute value but not in source, the data engine 330 of the proactive tax preparation system 100 contacts the appropriate data provider 120 to request the information. This step may be carried out in accordance with one or more of the data importation methods described in "Automated Tax Return with Universal Data Import," cross-referenced above and/or a financial data exchange protocol such as the Open Financial Exchange (OFX). For instance, the data engine 330 may query a plurality of data providers 120 with identification data of the taxpayer to determine which of the data providers are associated with the taxpayer's employer. The data provider 120 may comprise any provider of financial information about a taxpayer, including a payroll provider, bank, or broker. The data may be stored in various formats, e.g. Tax Exchange Format (TXF), Open Financial Exchange (OFX), Extensible Markup Language (XML), Document Type Definition (DTD), and mapped and/or converted for use by the tax preparation module 340.

After a new tax return has been proactively generated for a taxpayer the new return is stored together with returns in a new returns portion of the returns database 320. The new return is then provided to the taxpayer, for instance over a network connection. A pre-prepared message template is used to generate a notification alerting the taxpayer that all of the taxpayer's income information has been retrieved and a preliminary return generated. Or, any of the methods for generating and transmitting a message or request to the taxpayer or a user described in the "Automated Data Retrieval" application referenced above, could be used. An email notification could state the default data assignments made by the tax preparation system as well as the preliminary amount of return due to (or tax owed by) the taxpayer. It could also request that the user provide changes made from the prior year about any of the assumptions. The email message to the taxpayer may alternatively or in addition include a link to a secure website. The link includes the necessary information (e.g., a client ID) to generate and provide the draft return to a web server. When the taxpayer activates the link in the email, a browser application is invoked and contacts the web server, passing in the parameters that identify the client 110 (e.g., the client ID). The web server creates a web page, in one embodiment with an interface such as that shown in FIG. 2.

The interface includes a toolbar 510 with options that allow the user to view source information retrieved and used in generating the new tax return. The interface preferably includes sections for personal information 560, income information 530, deductions and credits 540, and the taxpayer's tax refund/tax due 550. Any information that that is not complete or which could not be imported may be highlighted on the page. In addition, the user has the option to edit information provided in the interface the using various edit buttons 515. Once a customer has reviewed and made any necessary updates to the information provided, he or she can click a "Final Review", "Complete my return," or "Review this return and prepare it for filing" button 570.

At this point, the customer is provided with a final set of questions to ensure that no changes from the prior year had occurred. These questions could be generated intelligently, for instance using one or more of the statistical models described the "My Tax History" application, referenced above. Assuming a taxpayer did not have any major changes, the entire process for the taxpayer could be completed in a very few number of screens.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings. It is therefore intended that the scope of the invention be limited not by this detailed description, but rather by the claims appended hereto.

What is claimed is:

1. A computer-implemented method of generating a new tax return for a taxpayer, the method comprising:
    extracting, by a proactive tax preparation system (PTPS) stored in a memory and executing on a processor, identification information about the taxpayer and an identity of a payroll provider from a previous tax return, wherein the identification information comprises an age group of the taxpayer;
    determining, by the PTPS, a likelihood of the payroll provider remaining the same since the previous tax return,
        wherein determining the likelihood is based on a multiple-regression analysis of a plurality of tax returns from a plurality of taxpayers over a multi-year period, and
        wherein the likelihood of the payroll provider remaining the same since the previous tax return is further based on at least one selected from a group consisting of the age group of the taxpayer, a marital status of the taxpayer, and an employment status of the taxpayer;
    requesting, automatically by the PTPS and without intervention of the taxpayer, tax data for the new tax return from the payroll provider based on the likelihood of the payroll provider remaining the same; and
    generating, automatically by the PTPS, the new tax return including the identification information and the tax data.

2. The computer-implemented method of claim 1, further comprising:
    obtaining the previous tax return from a desktop tax preparation application before extracting the identification information about the taxpayer.

3. The computer-implemented method of claim 1, further comprising providing the new tax return to the taxpayer by sending a message to the taxpayer including a link from which the new tax return can be accessed.

4. The computer-implemented method of claim 1, further comprising:
    requesting, automatically by the PTPS and without intervention of the taxpayer, data from a financial institution; and
    receiving the data from the financial institution.

5. The computer-implemented method of claim 1, further comprising:
    electronically filing the new tax return with a taxing authority.

6. A system for generating a new tax return for a taxpayer comprising:
    a processor and memory;
    a proactive tax preparation system (PTPS) executing on the processor and comprising:
        a returns processing module configured to:
            extract identification information about the taxpayer and an identity of a payroll provider from a previous tax return, wherein the identification information comprises an age group of the taxpayer; and
            determine a likelihood of the payroll provider remaining the same since the previous tax return,
                wherein determining the likelihood is based on a multiple-regression analysis of a plurality of tax returns from a plurality of taxpayers over a multi-year period, and
                wherein the likelihood of the payroll provider remaining the same since the previous tax return is further based on at least one selected from a group consisting of the age group of the taxpayer, a marital status of the taxpayer, and an employment status of the taxpayer;
        a data engine configured to:
            request, automatically and without intervention of the taxpayer, tax data for the new tax return from the payroll provider based on the likelihood of the payroll provider remaining the same; and
        a tax preparation module configured to:
            generate, automatically, the new tax return including the identification information and the tax data.

7. The system of claim 6, wherein the data engine is further configured to:
    generate and transmit a notification to the taxpayer of the new tax return generated by the tax preparation module.

8. The system of claim 7, wherein the data engine is further configured to:
    transmit the notification over a network connection, wherein the notification includes a link to a secure web server, and wherein the link identifies a web page including the new tax return.

9. The computer-implemented method of claim 1, wherein extracting identification information about the taxpayer from the previous tax return comprises:
    performing optical character recognition on the previous tax return to obtain alphanumeric data from the previous tax return; and
    processing the alphanumeric data from the previous tax return to obtain the identification information about the taxpayer.

10. The system of claim 6, wherein the returns processing module is further configured to:
    perform optical character recognition on the previous tax return to obtain alphanumeric data from the previous tax return; and
    process the alphanumeric data from the previous tax return to obtain the identification information about the taxpayer.

11. The system of claim 6, wherein the returns processing module is further configured to:
    obtain the previous tax return from a desktop tax preparation application before extracting the identification information about the taxpayer.

12. The system of claim 6, wherein the data engine is further configured to:
    request, automatically and without intervention of the taxpayer, data from a financial institution; and
    receive the data from the financial institution.

13. The system of claim 6, wherein the tax preparation module is further configured to:
    electronically file the new tax return with a taxing authority.

14. The computer-implemented method of claim 1, wherein the tax data comprises an income of the taxpayer.

15. The system of claim 6, wherein the tax data comprises an income of the taxpayer.

* * * * *